(12) United States Patent  (10) Patent No.: US 8,037,966 B2
Errera et al.  (45) Date of Patent: Oct. 18, 2011

(54) ROOF-MOUNTED MUFFLER FOR SYSTEM FOR GENERATING ELECTRIC POWER

(75) Inventors: Michael R. Errera, Milner, GA (US); Kenton D. Gills, Jonesboro, GA (US)

(73) Assignee: Caterpillar Inc., Peoria, IL (US)

( * ) Notice: Subject to any disclaimer, the term of this patent is extended or adjusted under 35 U.S.C. 154(b) by 421 days.

(21) Appl. No.: 12/216,218

(22) Filed: Jul. 1, 2008

(65) Prior Publication Data

US 2009/0321180 A1 Dec. 31, 2009

Related U.S. Application Data

(60) Provisional application No. 61/129,417, filed on Jun. 25, 2008.

(51) Int. Cl.
*F01N 13/18* (2010.01)

(52) U.S. Cl. ........ 181/243; 181/210; 181/203; 181/204; 181/205; 280/423.1

(58) Field of Classification Search .................. 181/203, 181/204, 205, 210, 243, 287, 30; 280/423.1; 52/144, 145
See application file for complete search history.

(56) References Cited

U.S. PATENT DOCUMENTS

| | | | |
|---|---|---|---|
| 2,177,687 A | 10/1939 | Bracken et al. | |
| 3,566,142 A | 2/1971 | Dabell | |
| 3,856,439 A | 12/1974 | Moehrbach | |
| 3,862,604 A | 1/1975 | Pelabon | |
| 4,011,849 A * | 3/1977 | Latham | 123/198 E |
| 4,128,769 A | 12/1978 | Bons et al. | |
| 4,141,427 A * | 2/1979 | Kirchweger et al. | 180/69.22 |
| 5,121,715 A * | 6/1992 | Nogami et al. | 123/41.7 |
| 5,297,517 A * | 3/1994 | Brandt et al. | 123/198 F |
| 5,778,832 A | 7/1998 | King et al. | |
| 5,784,267 A | 7/1998 | Koenig et al. | |
| 5,815,058 A | 9/1998 | Gizaw | |
| 5,850,061 A * | 12/1998 | Klompenhouwer et al. | 181/202 |
| 5,856,740 A | 1/1999 | Rau et al. | |
| 5,896,049 A | 4/1999 | Saunders et al. | |
| 5,929,610 A | 7/1999 | Friedlander et al. | |
| 6,005,381 A | 12/1999 | Saunders et al. | |
| 6,230,667 B1 | 5/2001 | Stauffer et al. | |
| 6,281,602 B1 | 8/2001 | Got et al. | |
| 6,351,692 B1 | 2/2002 | Eaton et al. | |
| 6,355,986 B1 | 3/2002 | Kato et al. | |
| 6,376,944 B1 | 4/2002 | Grizzle, Jr. et al. | |
| 6,397,821 B1 | 6/2002 | Spägele et al. | |
| 6,433,444 B1 | 8/2002 | de Vries | |
| 6,450,133 B1 | 9/2002 | Bernard et al. | |
| 6,457,552 B2 | 10/2002 | Maganas et al. | |
| 6,491,133 B2 | 12/2002 | Yamada et al. | |
| 6,507,128 B2 | 1/2003 | King et al. | |
| 6,520,124 B2 | 2/2003 | Bohm, II | |

(Continued)

*Primary Examiner* — Forrest M Phillips
(74) *Attorney, Agent, or Firm* — Finnegan, Henderson, Farabow, Garrett & Dunner LLP

(57) ABSTRACT

An exhaust system for an electric power generation system is disclosed. The exhaust system may include a muffler configured to suppress noise associated with operation of an engine associated with the electric power generation system. The muffler may be configured to be mounted in a roof of a housing configured to contain at least part of the electric power generation system. The muffler may be configured to form an outside surface of the roof. Removal of the engine from the housing may be facilitated by removal of the muffler from the roof, such that the engine can be lifted out of the housing.

14 Claims, 2 Drawing Sheets

U.S. PATENT DOCUMENTS

| | | | |
|---|---|---|---|
| 6,534,737 B1 | 3/2003 | Rademacher et al. |
| 6,552,454 B2 | 4/2003 | Kern et al. |
| 6,555,929 B1 | 4/2003 | Eaton et al. |
| 6,601,542 B2 | 8/2003 | Campion |
| 6,630,756 B2 | 10/2003 | Kern et al. |
| 6,631,310 B1 | 10/2003 | Leslie |
| 6,633,799 B2 | 10/2003 | Krakovich et al. |
| 6,639,331 B2 | 10/2003 | Schultz |
| 6,644,247 B2 | 11/2003 | Campion |
| 6,668,629 B1 | 12/2003 | Leslie |
| 6,697,951 B1 | 2/2004 | Sinha et al. |
| 6,700,356 B1 | 3/2004 | Dorn |
| 6,701,221 B1 | 3/2004 | Eaton et al. |
| 6,731,098 B1 | 5/2004 | Hintz et al. |
| 6,737,762 B2 | 5/2004 | Koenig |
| 6,765,157 B2 | 7/2004 | Rademacher et al. |
| 6,765,304 B2 | 7/2004 | Baten et al. |
| 6,784,562 B2 | 8/2004 | Gennesseaux |
| 6,784,574 B2 | 8/2004 | Turner et al. |
| 6,786,195 B2 | 9/2004 | Doelker |
| 6,798,627 B2 | 9/2004 | Schultz et al. |
| 6,824,067 B2 | 11/2004 | Kern et al. |
| 6,869,367 B2 | 3/2005 | Herdin et al. |
| 6,876,103 B2 | 4/2005 | Radusewicz et al. |
| 6,877,481 B2 | 4/2005 | Fahringer et al. |
| 6,895,903 B2 | 5/2005 | Campion |
| 6,919,518 B2 | 7/2005 | Rademacher et al. |
| 6,965,818 B2 | 11/2005 | Koenig et al. |
| 6,980,911 B2 | 12/2005 | Eaton et al. |
| 6,994,074 B2 | 2/2006 | Doelker |
| 7,005,760 B2 | 2/2006 | Eaton et al. |
| 7,007,966 B2 | 3/2006 | Campion |
| 7,016,793 B2 | 3/2006 | Ye et al. |
| 7,021,293 B2 | 4/2006 | Dölker |
| 7,072,759 B2 | 7/2006 | Dolker |
| 7,081,682 B2 | 7/2006 | Campion |
| 7,082,896 B2 | 8/2006 | Allen et al. |
| 7,121,257 B2 | 10/2006 | Dölker |
| 7,129,593 B2 | 10/2006 | King et al. |
| 7,157,811 B2 | 1/2007 | Eaton et al. |
| 7,202,638 B2 | 4/2007 | Ye et al. |
| 7,207,305 B2 | 4/2007 | Dolker |
| 7,221,061 B2 | 5/2007 | Alger et al. |
| 7,259,481 B2 | 8/2007 | Eaton et al. |
| 7,262,516 B2 | 8/2007 | Kleen |
| 7,271,571 B2 | 9/2007 | Ye et al. |
| 7,315,769 B2 | 1/2008 | Balan et al. |
| 7,319,307 B2 | 1/2008 | Wiegman et al. |
| 7,352,072 B2 | 4/2008 | Dolker et al. |
| 7,362,696 B2 | 4/2008 | Ferry et al. |
| 2002/0121818 A1 | 9/2002 | Turner et al. |
| 2002/0158530 A1 | 10/2002 | Gennesseaux |
| 2003/0011196 A1 | 1/2003 | Kern et al. |
| 2003/0011258 A1 | 1/2003 | Kern et al. |
| 2003/0020482 A1 | 1/2003 | Hobelsberger et al. |
| 2003/0155330 A1 | 8/2003 | Rademacher et al. |
| 2004/0016627 A1 | 1/2004 | Rademacher et al. |
| 2004/0079329 A1 | 4/2004 | Doelker |
| 2004/0104577 A1 | 6/2004 | Alger et al. |
| 2005/0224047 A1 | 10/2005 | Doelker |
| 2005/0253394 A1 | 11/2005 | Dolker et al. |
| 2006/0042856 A1 * | 3/2006 | Kim et al. ..................... 180/296 |
| 2006/0052922 A1 | 3/2006 | Koenig et al. |
| 2006/0080013 A1 | 4/2006 | Koenig et al. |
| 2006/0082228 A1 | 4/2006 | Urbahn et al. |
| 2007/0013191 A1 | 1/2007 | Kleen |
| 2007/0145745 A1 | 6/2007 | Woods et al. |
| 2008/0073979 A1 | 3/2008 | Wiegman et al. |
| 2008/0074910 A1 | 3/2008 | Casteel et al. |

* cited by examiner

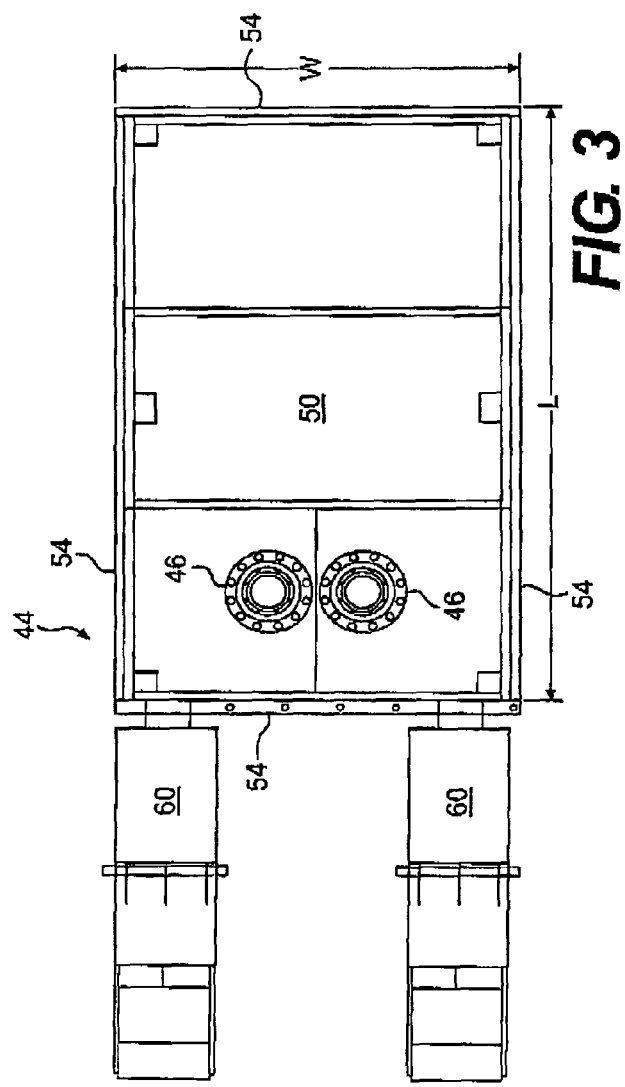
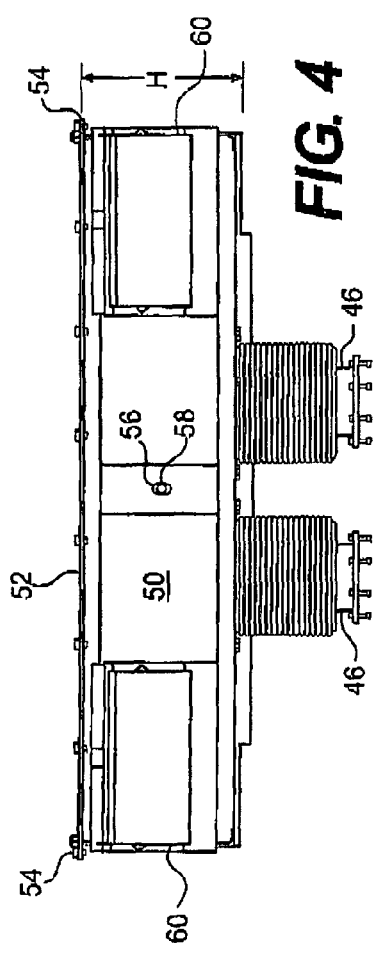

ROOF-MOUNTED MUFFLER FOR SYSTEM FOR GENERATING ELECTRIC POWER

This application claims the benefit of priority under 35 U.S.C. §119(e) of U.S. Provisional Application No. 61/129,417, filed Jun. 25, 2008, the disclosure of which is incorporated herein by reference.

TECHNICAL FIELD

The present disclosure relates to a roof-mounted muffler, and more particularly, to a roof-mounted muffler for a system for generating electric power.

BACKGROUND

It may be desirable to generate electric power, for example, in situations in which electric power is not available from an electric power utility source, for example, in remote locations and/or locations experiencing a power outage. This may be accomplished, for example, using electric power generation systems that are configured to generate electric power via operation of one or more internal combustion engines to drive an electric machine configured to convert mechanical energy supplied by the one or more engines into electric power.

It may be desirable for such power generation systems to be contained within a housing configured to be transported to a location in need of electric power. One possible drawback with such systems may be that the housing renders it difficult to install and or remove components of the power generation system, particularly components located farthest from an opening of the housing. For example, in a trailer-style housing, it may be necessary to first remove numerous components via a rear door in order to remove the engine or generator of the power generation system for service or replacement. Further, it may be desirable for the engine of power generation systems to be provided with a muffler to suppress engine noise, for example, to meet local noise regulations and/or reduce the intrusiveness of the use of such a system, for example, in urban or suburban environments.

Portable power modules are disclosed in U.S. Pat. No. 7,007,966 issued to Campion ("the '966 patent"). The '966 patent discloses a portable power module trailerable over public roads, including a shipping container enclosing an motor and generator for producing a power output of about one megawatt. According to one disclosed power module, an exhaust gas silencer is installed on top of the shipping container during operation. The portable power modules disclosed in the '966 patent do include, however, a disclosed ability to facilitate ease of removal of components from the shipping container for service and/or replacement.

The systems and methods described in an exemplary manner in the present disclosure may be directed to achieving mitigating or overcoming one or more of the drawbacks set forth above.

SUMMARY

In one aspect, the present disclosure includes an exhaust system for an electric power generation system. The exhaust system may include a muffler configured to suppress noise associated with operation of an engine associated with the electric power generation system. The muffler may be configured to be mounted in a roof of a housing configured to contain at least part of the electric power generation system, wherein the muffler is configured to form an outside surface of the roof. Removal of the engine from the housing may be facilitated by removal of the muffler from the roof, such that the engine can be lifted out of the housing.

According to another aspect, a housing for at least partially containing an electric power generation system may include two opposing side walls and a roof extending between the side walls. The roof may define an opening configured to receive a muffler, which forms at least a portion of the surface of the roof. The housing may be configured to contain an engine associated with the electric power generation system, and the opening in the roof may be configured to permit removal of the engine when the muffler is not received in the opening.

According to a further aspect, a system for generating electric power may include an engine configured to output mechanical power. The engine may include an exhaust system, including a muffler configured to suppress noise associated with operation of the engine. The system may further include an electric machine configured to convert mechanical power into electric power, the electric machine being operably coupled to the engine. The system may also include a housing configured to contain at least one of the engine and the electric machine, the housing including at least one wall and a roof configured to define an exterior of the housing. The roof may define an opening configured to receive the muffler, such that when the muffler is received in the opening, a surface of the muffler forms an exterior surface of the roof, and the opening in the roof may be configured to permit removal of the engine when the muffler is not received in the opening.

According to still another aspect, a method of removing an engine from a housing of an electric power generation system, including an engine contained in the housing, may include removing a muffler mounted in an opening defined in a roof of the housing, and lifting the engine out of the housing via the opening in the roof.

BRIEF DESCRIPTION OF THE DRAWINGS

FIG. 3 is a schematic bottom view of an exemplary embodiment of an exhaust system.

FIG. 4 is a schematic end view of the exemplary embodiment shown in FIG. 3.

DETAILED DESCRIPTION

Figure 1:
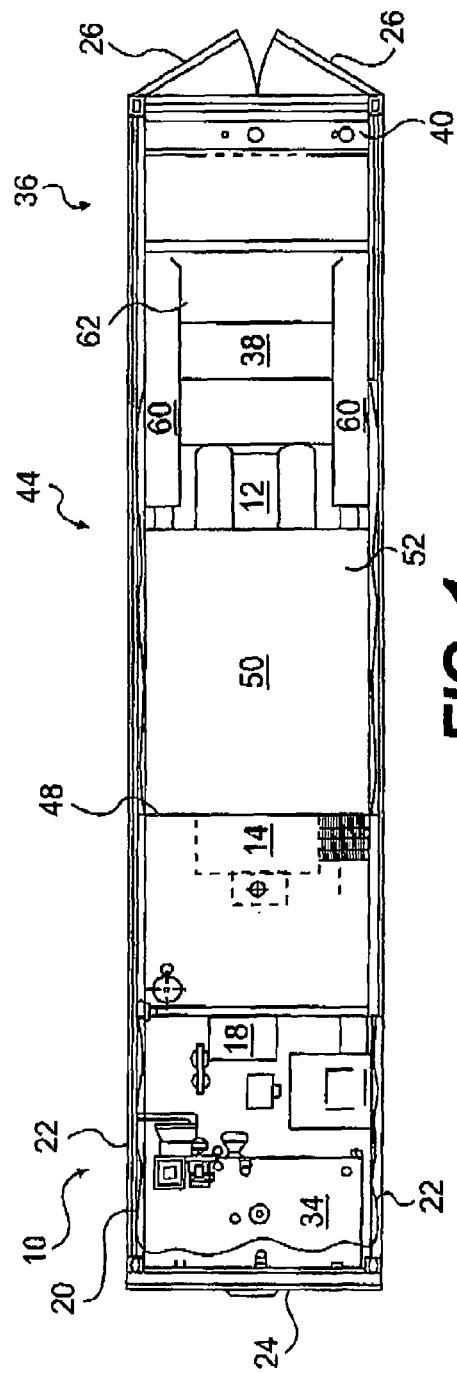
FIG. 1 is a schematic, partial cutaway plan view of an exemplary embodiment of a system for generating electric power.
Figure 2:
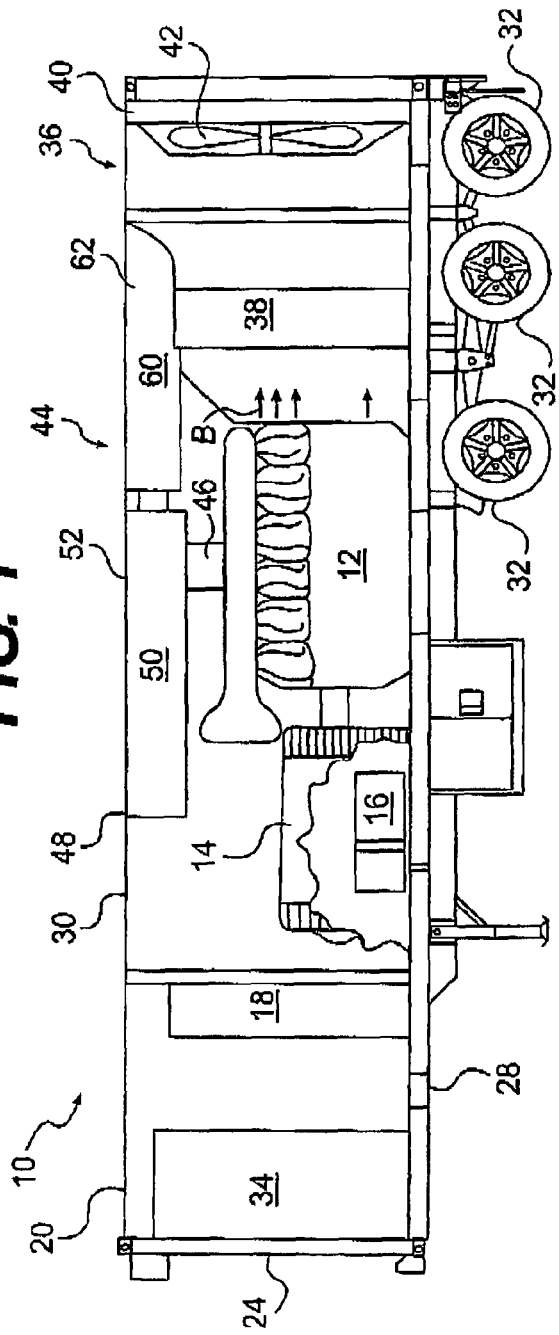
FIG. 2 is a schematic, partial cutaway elevation view of the exemplary embodiment shown in FIG. 1.

FIGS. 1 and 2 show an exemplary embodiment of a system 10 for generating electric power. System 10 may include an engine 12 configured to supply mechanical power and an electric machine 14 operably coupled to engine 12 and configured to convert mechanical power into electric power. Engine 12 may be any internal combustion engine, including a spark-ignition engine, a compression ignition engine, a homogeneous-charge compression-ignition engine, and/or a gas turbine engine. Engine 12 may be configured to run on any fuel, such as, for example, gasoline, diesel fuel including bio-diesel fuel, natural gas, ethanol, methanol, hydrogen, and/or any combinations thereof. Other types of engines and fuels are contemplated. Electric machine 14 may be any type of electric generator known to those skilled in the art. For example, electric machine 14 may include a three-phase AC synchronous generator.

System 10 may further include power load connections 16 (e.g., including one or more bus bars) configured to facilitate supply of electric power generated by system 10 to any device or system that receives input of a source of electric power, such as, for example, a power grid. According to some embodiments, a number of systems 10 may be coupled to one another and/or used together to supply additional electric power.

As depicted in FIGS. 1 and 2, exemplary system 10 may include one or more control panels 18 configured to control operation of engine 12, electric machine 14, and/or any systems associated with system 10. For example, control panel(s) 18 may include electronic control systems configured to control operation of engine 12 and/or electric machine 14, such that system 10 supplies electric power in a desired and/or controlled manner. According to some embodiments, control panel 18 may include an interface for providing an operator with information or data relating to operation of engine 12 and/or electric machine 14, and further, may include controls configured to facilitate an operator's ability to control operation of engine 12, electric machine 14, and/or any other systems associated with system 10. For example, control panel 18 may facilitate an operator's control of the electric power output of system 10, for example, by controlling the voltage and frequency of the power output.

According to the exemplary embodiment shown in FIGS. 1 and 2, system 10 may include a housing 20 configured to provide protection to various components of system 10. For example, housing 20 may include walls, for example, opposing side walls 22, a front wall 24, and one or more rear doors 26, a floor 28, and a roof 30, defining an exterior and, possibly also, an interior of housing 20. According to some embodiments, system 10 may include one or more devices 32 configured to facilitate transport of system 10 between sites that may desire a supply of electric power. For example, the exemplary embodiment shown in FIG. 1 includes a number of wheels for facilitating towing of system 10 via a vehicle, such as a truck or tractor (e.g., housing 20 may be in the form at least similar to a trailer configured to be towed in a manner similar to trailers of a tractor trailer rig). Other types of devices 32 (e.g., tracks, wheels configured to travel along railroad tracks, pontoons, and/or skids) known to those skilled in the art are contemplated. Some embodiments of housing 20 may define one or more passages between an exterior of housing 20 and an interior of housing 20.

According to some embodiments, system 10 may include a reservoir 34 (e.g., a fuel tank) within the interior of housing 20 for providing a supply of fuel to engine 12. Reservoir 34 may be coupled to engine 12 via one or more fuels lines (not shown). According to some embodiments, reservoir 34 may be located external to housing 20 and/or fuel may be supplied via an external source, such as, for example, a pipe line for supplying a fuel, such as, for example, gasoline, diesel fuel, natural gas, hydrogen, ethanol, methanol, and/or any combinations thereof.

According to some embodiments, system 10 may include a cooling system 36 configured to regulate the temperature of engine 12 and/or electric machine 14. For example, cooling system 36 may include one or more heat exchangers 38, such as, for example, one or more air-to-air-after-coolers (ATAAC) operably coupled to engine 12 and/or one or more radiators 40, such as, for example, a jacket water radiator, operably coupled to engine 12. According to some embodiments, engine 12 may include one or more turbochargers (not shown), and heat exchanger(s) 38 may be operably coupled to the one or more turbochargers to cool air entering the turbocharger(s). System 10 may include one or more fans (not shown), for example, located between engine 12 and heat exchanger 38. Such a fan may be operably coupled to engine 12 via a drive belt (not shown) and/or may be driven via an electric motor (not shown), and may supply a flow of air to and/or through heat exchanger 38 in order to provide cooling air to heat exchanger 38.

Exemplary radiator(s) 40 may be configured to receive and cool a flow of coolant (e.g., a liquid coolant), which may be circulated into and/or through engine 12 via coolant lines (not shown), thereby cooling engine 12. One or more fans 42 may be associated with radiator 40 and may be configured to provide a flow of cooling air to radiator 40. Fan(s) 42 may be driven, for example, via an electric motor (not shown), which may be coupled to fan 42 via, for example, a belt drive (not shown).

According to some embodiments, engine 12 may include an exhaust system 44 configured to remove heat and/or combustion products from housing 20, and/or to suppress or absorb noise from engine 12. For example, exhaust system 44 may include one or more risers 46 extending upward from engine 12 toward roof 30. Roof 30 may define an opening 48 (see FIGS. 1 and 2) configured to receive a muffler 50 in flow communication with risers 46. For example, muffler 50 may define a generally rectangular shape having a length L, height H, and width W (FIGS. 3 and 4). Risers 46 may have insulation, for example, wrapped therearound to reduce heat expelled into housing 20. As shown in FIG. 2, muffler 50 may be configured to be mounted in opening 48 of roof 30, for example, such that an upper surface 52 of muffler 50 lies generally flush with roof 30. For example, muffler 50 may include a flange 54 (FIGS. 3 and 4) extending at least partially around upper surface 52 and configured to lie atop (e.g., and be coupled to) side walls 22 of housing 20.

According to some embodiments, muffler 50 may include one or more apertures 56 (e.g., slightly elongated apertures) (see FIG. 4) configured to receive dowel pins 58, which may help provide longitudinal alignment with respect to housing 20, while still permitting thermal expansion of muffler 50. According to some embodiments, configuration of muffler 50 in a generally rectangular shape (FIG. 1) may serve to mitigate and/or eliminate thermal distortion sometimes associated with cylindrical mufflers that are fixed at one or more ends, which may take on an undesirable bellows shape upon heating.

According to some embodiments, by mounting muffler 50 in roof 38, components of system 10 may be installed and/or removed via opening 48 in roof 30, either prior to installation of muffler 50 or after removal of muffler 50, respectively. This may prevent the necessity of the removal of the majority of components of system 10 when servicing and/or replacing other components of system 10 (e.g., when servicing and/or replacing engine 12 and/or electric machine 14).

According to some embodiments, exhaust system 44 may further include one or more extensions 60 downstream of muffler 50 configured to provide a flow path for exhaust gas from engine 12 to the exterior of housing 20 via muffler 50. For example, as shown in FIG. 1, extension(s) 60 may extend above heat exchanger 38 from muffler 50 to one or more opening(s) 62 in roof 30, such that exhaust gas exits via opening(s) 62.

INDUSTRIAL APPLICABILITY

Exemplary system 10 may be used to generate electric power, for example, in situations in which electric power is not available from an electric power utility source, for example, in remote locations and/or locations experiencing a power outage. One or more engines 12 of exemplary system 10 may be configured to output mechanical power, and one or more electric machines 14 may be configured to convert mechanical power into electric power. One or more control panels 18 may be configured facilitate control of at least one of engine 12 and electric machine 14. Housing 20 may be configured to contain at least one of engine 12 and electric machine 14.

Exemplary exhaust system 44 may be configured to remove heat and/or combustion products from housing 20, and/or to suppress or absorb noise from engine 12. For example, one or more risers 46 of exhaust system 44 may extend upward from engine 12 toward roof 30. Opening 48 in roof 30 (see FIGS. 1 and 2) may be configured to receive muffler 50 in flow communication with risers 46. Exemplary muffler 50 may define a generally rectangular shape having a length L, height H, and width W (FIGS. 3 and 4).

According to some embodiments, muffler 50 may be configured to be mounted in opening 48 of roof 30, for example, such that upper surface 52 of muffler 50 lies generally flush with roof 30 (FIG. 2). For example, muffler 50 may include a flange 54 (FIGS. 3 and 4) extending at least partially around upper surface 52 and configured to lie atop (e.g., and be coupled to) side walls 22 of housing 20. By mounting muffler 50 in opening 48 of roof 38, components of system 10 may be installed and/or removed via opening 48 in roof 30, either prior to installation of muffler 50 or after removal of muffler 50, respectively. This may prevent the necessity of the removal of the majority of components of system 10 (e.g., via rear door(s) 26) when servicing and/or replacing other components of system 10 (e.g., when servicing and/or replacing engine 12 and/or electric machine 14).

It will be apparent to those skilled in the art that various modifications and variations can be made to the exemplary disclosed roof-mounted muffler. Other embodiments will be apparent to those skilled in the art from consideration of the specification and practice of the exemplary disclosed systems and methods. It is intended that the specification and examples be considered as exemplary only.

What is claimed is:

1. An exhaust system for an electric power generation system comprising a housing configured to contain at least a portion of the electric power generation system, the housing defining a roof, the exhaust system comprising:
   a muffler configured to suppress noise associated with operation of an engine associated with the electric power generation system,
   wherein the muffler is configured to be mounted in the roof of the housing and includes an exit at the roof of the housing,
   wherein the muffler is configured to form an outside surface of the roof,
   wherein the exhaust system includes a conduit configured to provide flow communication between the engine and the muffler such that exhaust exits via the roof, and
   wherein removal of the engine from the housing is facilitated by removal of the muffler from the roof, such that the engine can be lifted out of the housing.

2. The exhaust system of claim 1, wherein the muffler defines an upper periphery, and a flange extends at least partially around the upper periphery of the muffler, and wherein the flange is configured to be operably coupled to a portion of the housing, such that the muffler is mounted in the roof of the housing.

3. The exhaust system of claim 1, wherein the muffler defines a generally rectangular shape.

4. The exhaust system of claim 1, further including at least one riser operably coupled to the muffler and configured to provide flow communication between the engine and the muffler.

5. The exhaust system of claim 1, further including at least one extension operably coupled to the muffler and configured to provide flow communication from the muffler to an opening in the roof of the housing.

6. The exhaust system of claim 1, wherein the muffler defines two opposing sides, and at least one of the opposing side defines an aperture configured to receive a dowel pin for maintaining a longitudinal position of the muffler with respect to the housing and permitting at least one of expansion and contraction of the muffler.

7. A trailer for at least partially containing an electric power generation system, the electric power generation system comprising an engine and an exhaust system comprising a conduit providing flow communication with a muffler, the trailer comprising:
   a housing comprising
      two opposing side walls; and
      a roof extending between the side walls,
   wherein the roof defines an opening configured to receive the muffler, with the muffler forming an outside surface of the roof,
   wherein the housing is configured to contain the engine,
   wherein the housing is configured such that the exhaust system extends between the engine and the roof, such that exhaust from the engine exits from the roof via the muffler, and
   wherein the opening in the roof is configured to permit removal of the engine from the housing when the muffler is not received in the opening.

8. The housing of claim 7, wherein the opening is a generally rectangular-shaped opening.

9. A system for generating electric power, the system comprising:
   an engine configured to output mechanical power, the engine including an exhaust system including a muffler configured to suppress noise associated with operation of the engine;
   an electric machine configured to convert mechanical power into electric power, the electric machine being operably coupled to the engine; and
   a housing containing the engine and the electric machine, the housing including at least one wall and a roof,
   wherein the roof defines an opening,
   wherein the muffler is mounted in the opening in the roof and forms an outside surface of the roof,
   wherein the exhaust system includes a conduit that extends between the engine and the muffler to provide flow communication between the engine and muffler such that exhaust from the engine exits from the roof via the muffler, and
   wherein the opening in the roof is configured to permit removal of the engine when the muffler is not received in the opening.

10. The system of claim 9, wherein the muffler defines an upper periphery, and further includes a flange extending at least partially around the upper periphery of the muffler, and wherein the muffler is operably coupled to the housing via the flange.

11. The system of claim 9, wherein the muffler defines a generally rectangular shape.

12. The system of claim 9, further including a cooling system configured to cool at least one of the engine and the electric machine.

13. The system of claim 9, wherein the opening in the roof is configured to permit removal of the electric machine when the muffler is not received in the opening.

14. A method of removing an engine from a housing of an electric power generation system, wherein the electric power generation system comprises an engine contained in the housing and an exhaust system, and the housing includes a roof, wherein the exhaust system includes a conduit that extends between the engine and the roof of the housing, the method comprising:

removing a muffler mounted in an opening defined in the roof of the housing, the muffler forming an outside surface of the roof; and lifting the engine out of the housing via the opening in the roof.

\* \* \* \* \*